United States Patent

[11] 3,548,952

[72] Inventor David E. Carhart
       Cedar Point Rte., Dove Creek, Colo. 81324
[21] Appl. No. 709,392
[22] Filed Feb. 29, 1968
[45] Patented Dec. 22, 1970

[54] CROP CUTTER
     6 Claims, 9 Drawing Figs.
[52] U.S. Cl. .................................................. 171/95
[51] Int. Cl. ............................................... A01d 15/00
[50] Field of Search ...................................... 171/62, 70,
                               87, 88, 89, 90, 93, 95, 97, 128, 61

[56]           References Cited
          UNITED STATES PATENTS
1,462,948   7/1923  Thomas ....................... 171/58
412,491    10/1889  Ford ............................. 171/70
2,936,837   5/1960  DeLust et al. ................. 171/95X

*Primary Examiner*—Antonio F. Guida
*Attorney*—C. Harvey Gold

ABSTRACT: A crop cutter, for pulling and severing vines from their roots implanted in spaced rows, having a cutting wheel, rotatably mounted on a support shaft, and positioning means affixed to the support shaft for drawing the cutting wheel along a row at an angle of 10 to 45 degrees with said row and at an angle of 45 to 80 degrees with ground level. Lifting means, driven by the rotating cutting wheel, can be positioned on opposite sides of the row of crops to support the vines as they are severed from their roots and lift them to an elevated position for deposit in a harvester or return to ground level.

INVENTOR.
DAVID E. CARHART
BY
HIS ATTORNEY

PATENTED DEC 22 1970

INVENTOR.
DAVID E. CARHART
BY
C. Harry Gold

HIS ATTORNEY

PATENTED DEC 22 1970

INVENTOR.
DAVID E. CARHART
BY
C. Harvey Gold
HIS ATTORNEY

CROP CUTTER

This invention relates generally to a device for cutting and pulling crops to be harvested.

It is the principal object of this invention to provide a device for severing growing vines from their roots at a point below ground level while supporting the cut vines to prevent them from falling to the ground as they are elevated to a harvester or placed in windrows, which device is simple in construction and easy to operate.

Briefly, the invention comprises a crop cutter for severing vines from their roots implanted in spaced rows which comprises a cutting wheel, rotatably mounted on a support shaft, having a cutting edge about its periphery for cutting the vines from said roots; positioning means secured to said support shaft for drawing said cutting wheel along said row at an angle of 10 to 45 degrees with the longitudinal axis of said row and at an angle of 45 to 80 degrees with the ground level; and lifting means, supported by said positioning means, for supporting said vines as said cutting wheel severs them from their roots and for lifting said vines to an elevated position above ground level as the cutting wheel is drawn along the row and thereafter depositing the vines in a harvester or in windrows. Preferably, first and second lifting means are positioned on opposite sides of the row of crops to be cut by the wheel for gently lifting and depositing the severed vines.

So that the invention may be more readily understood, reference is made to the accompanying drawings which are offered by way of example only and are not to be taken as limiting the invention, the scope of which is defined by the appended claims.

Figure 1:
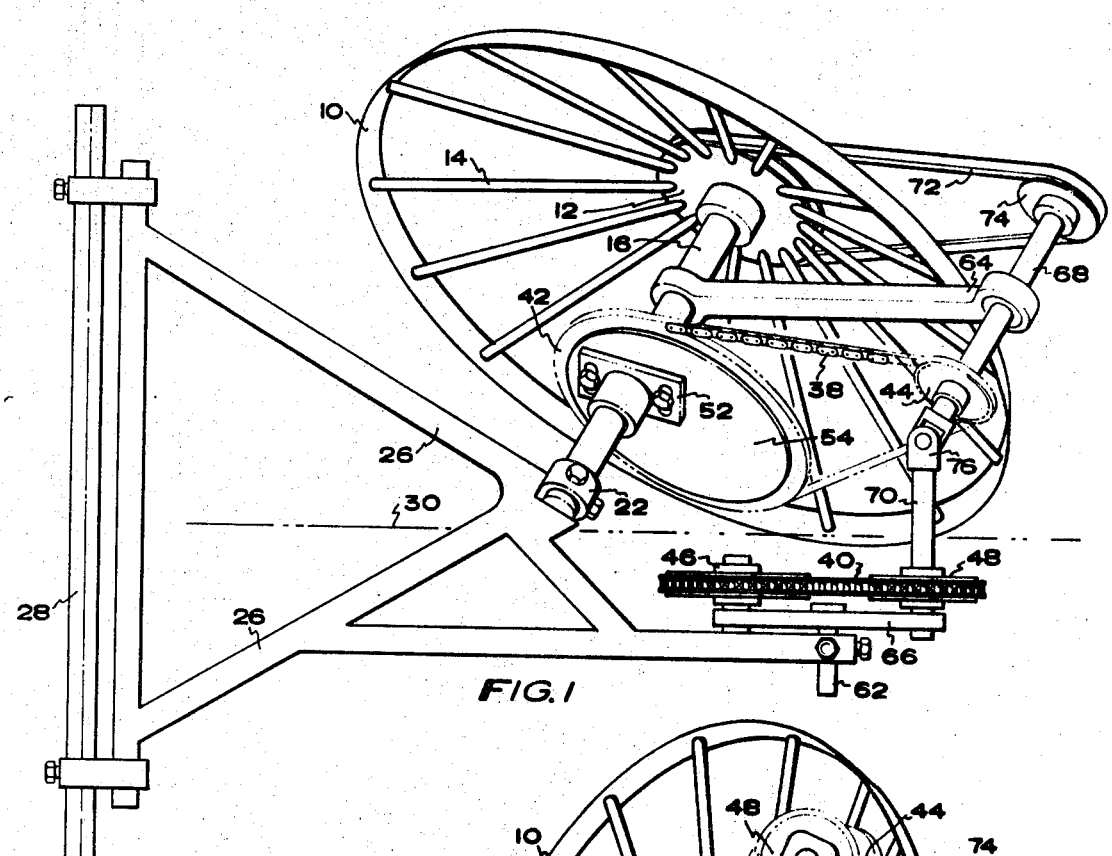
FIG. 1 is a top view of the cutter of this invention, attached to a conventional drawbar, particularly showing the angular relationship of the cutting wheel with respect to the row of crops to be cut. For purposes of clarity the support fingers are not shown attached to the drive chains.
Figure 2:
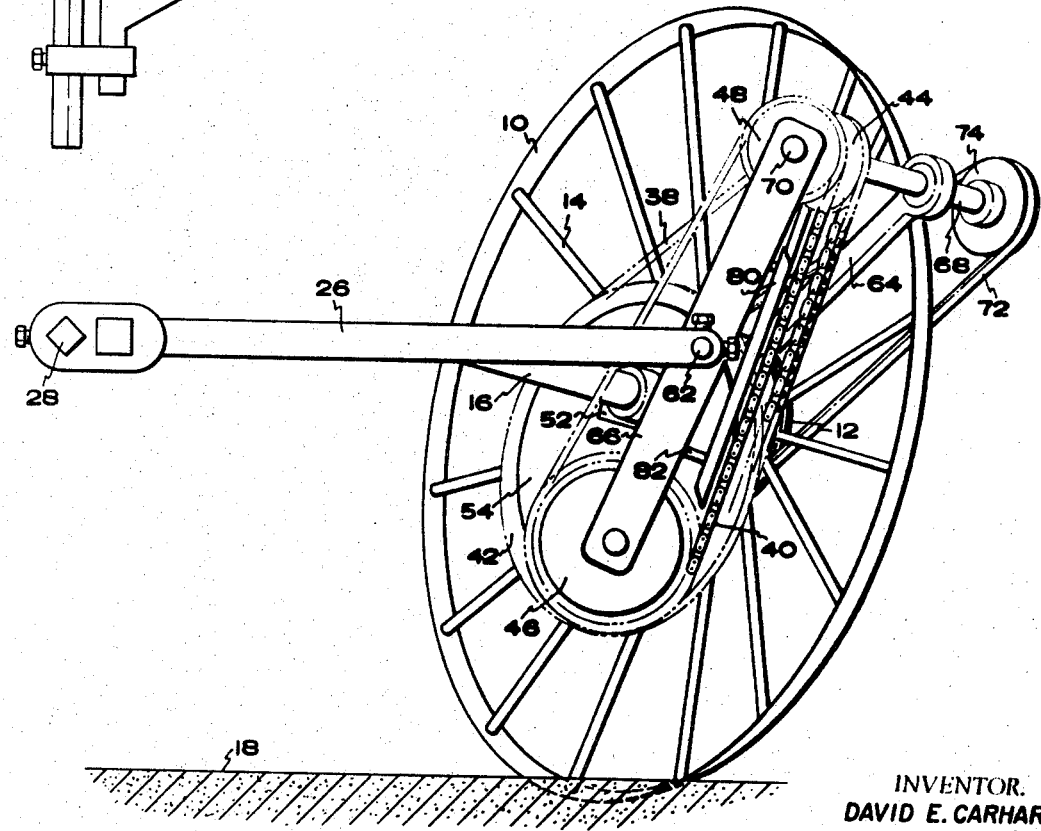
FIG. 2 is a plan elevation view of the cutter positioned to be drawn along a row of crops. For purposes of clarity the support fingers are not shown attached to the drive chains.
Figure 3:
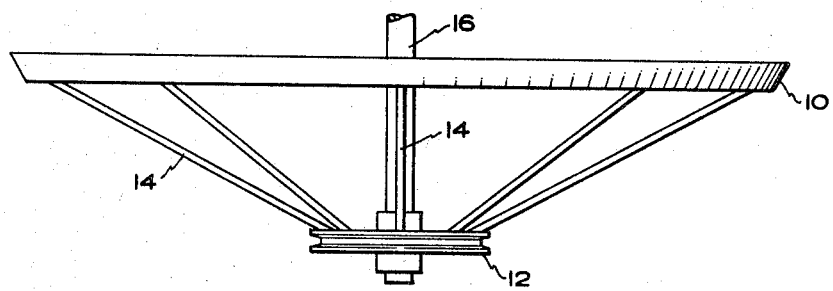
FIG. 3 is a side view of the preferred cutting wheel of this invention.
Figure 4:
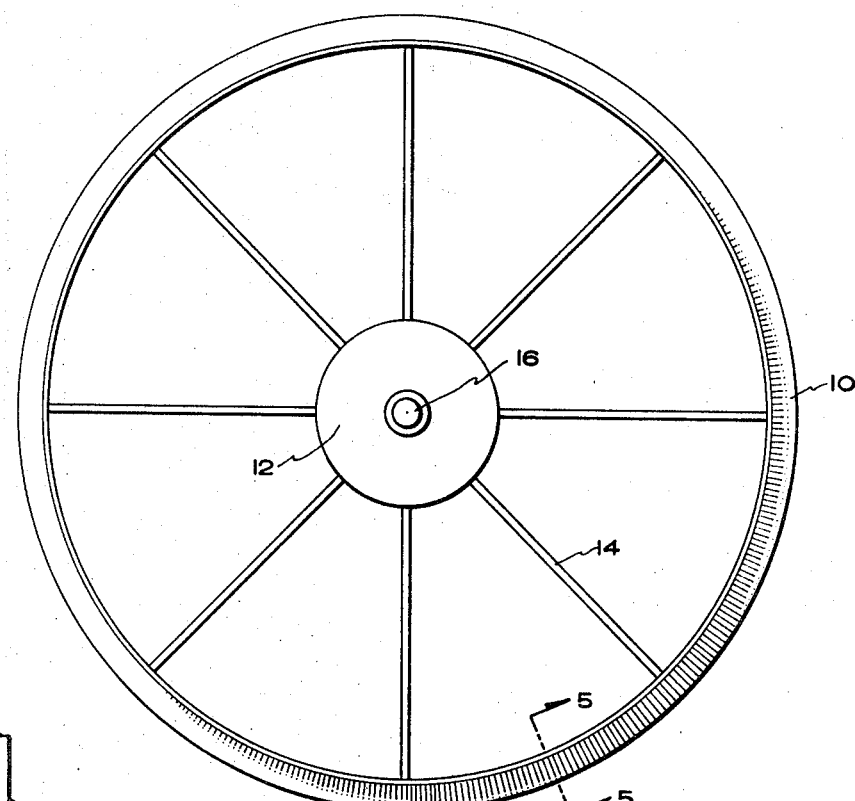
FIG. 4 is a plan elevation view of the cutting wheel.
Figure 5:
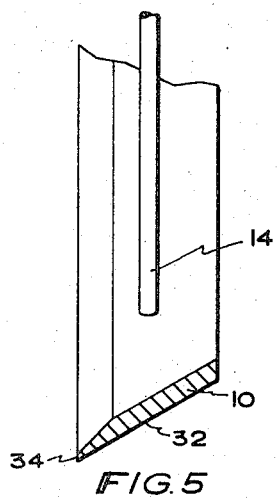
FIG. 5 is a sectional view taken along the plane of line 5–5 of FIG. 4.
Figure 6:
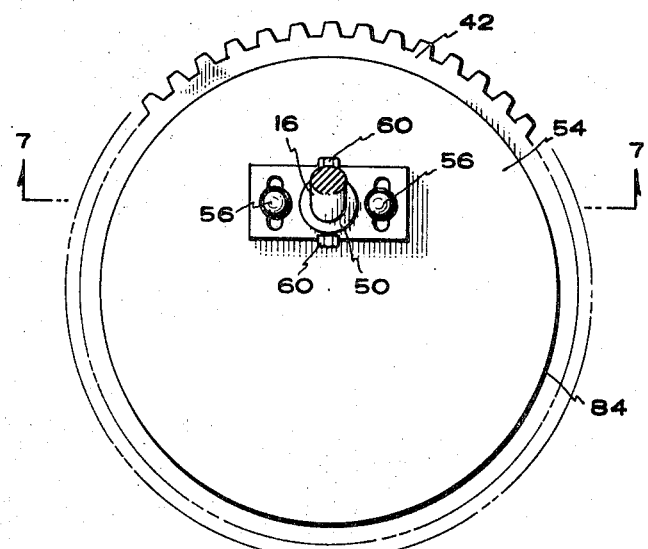
FIG. 6 is a plan elevation view of an adjustable sprocket for positioning the support fingers at a predetermined elevation above ground level.
Figure 7:
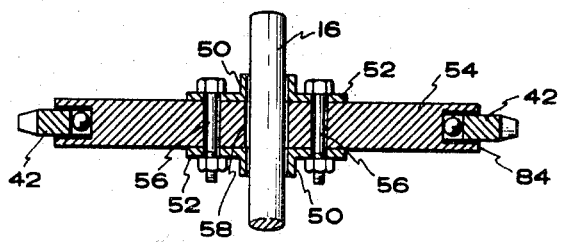
FIG. 7 is a section view taken along the plane of line 7–7 of FIG. 6.
Figures 8, 9:
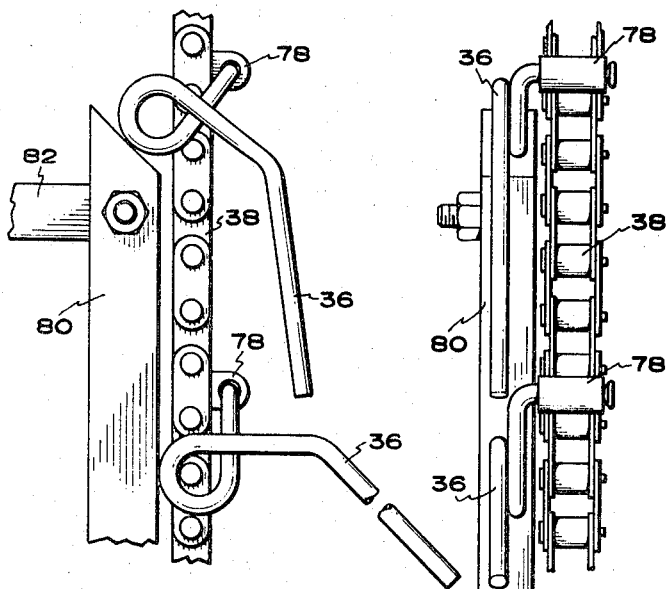
FIG. 8 is a side view of a segment of chain mounted support fingers and a coacting cam plate for moving the fingers to a support position.
FIG. 9 is a plan elevation view of the segment of support fingers, drive chain and cam plate.

Referring now more particularly to the drawings, there is shown a cutting wheel 10 mounted on an offset hub 12 with spaced spokes 14. Hub 12 is rotatably mounted on support shaft 16 so that wheel 10 rotates at an angle of 45 to 80 degrees with the ground level. The angle of wheel 10 with ground level 18 can be changed by adjusting shaft 16 in housing 22 affixed to frame 26. The frame in turn is connected to drawing means such as the drawbar 28 of a traction vehicle, now shown in the drawings, e.g. a tractor. When frame 26 is moved in a direction parallel with crop row 30 wheel 10, in addition to being positioned at an angle with ground level, is held at an angle of 10 to 45° with the row. Preferably frame 26 is adjustably connected to drawbar 28 so that the position of wheel 10 with respect to crop row 30 can be changed.

Wheel 10 is along row 30 so that its bottom cutting surface 32, i.e., the outside periphery of the wheel, is ¼ to 3 inches below ground level 18. Preferably, the wheel's bottom surface or cutting surface 32 is tapered at an angle of 10 to 45+ with the center axis of the wheel so that it is positioned in a plane substantially parallel with ground level 18 when the wheel is in its cutting position. As wheel 10 is pulled it rotates and slides along row 30 because of its angular position with respect to said row. Accordingly, the wheel's inside edge 34 acts as a cutting blade which preferably severs the roots of crops growing along the row. However, depending on soil conditions, the plants can be pulled from the soil by the wheel as it moves along the row.

As the vines are severed from their roots or otherwise pulled from the soil they are no longer supported by said soil and fall to the ground if not supported in some other fashion. Once on the ground they are difficult to pick up without bruising or otherwise injuring them. Accordingly, support fingers 36 are positioned on opposite sides of the growing vine for supporting them when they are severed from their roots or pulled from the soil by cutting wheel 10. In addition, as cutting wheel 10 continues to move along row 30 the support fingers 36 lift the severed vine upwardly away from ground level 18 where they can be deposited in a harvester for stripping or layed in a windrow for subsequent harvesting.

Support fingers 36 are mounted on chains 38 and 40 which in turn are positioned on sprockets 42 and 44, and 46 and 48 respectively. Sprocket 42 is mounted on shaft 16 between wheel hub 12 and crop row 30 and is provided with offset mounting means to control the elevation of the support fingers above ground level and to compensate for the tilt of shaft 16. The offset-mounting means includes mounting sleeves 50 attached to positioning plates 52 which are adjustably secured to the opposite sides of housing 54 with bolts 56. Shaft 16 passes through port 58, which port is offset from the center of housing 54, and is secured within sleeves 50 with bolts 60. By shifting the position of plate 52 on housing 54 and by rotating the housing on shaft 16 the angle and elevation of housing 54 with respect to ground level 18 are adjusted. Sprocket 42 is mounted on housing 54 in a conventional fashion to be freely rotatable thereon.

Sprocket 46 is rotatably mounted on shaft 62 at a position spaced-apart from sprocket 42 so that it is on the side of row 30 opposite from sprocket 42. Chain 40 mounted on sprocket 46 is driven with sprocket 48 while chain 38, mounted on sprocket 42, is driven with sprocket 44. The drive sprockets 44 and 48 are keyed to drive shafts 68 and 70 respectively which are connected together with universal joint 76 and are supported at an elevated position above sprockets 42 and 46 with supports 64 and 66. Drive shaft 68 is keyed to pulley 74 which in turn is driven with belt 72 mounted on hub 12 of wheel 10. Accordingly, when wheel 10 is turned its rotational movement drives chains 38 and 40.

As indicated, support fingers 36 are used to elevate the severed vines to an elevation where they can be deposited into a harvester or windrows on the ground. The support fingers are preferably journaled to chains 38 and 40 with sleeves 78 which in turn are attached to the chains in a space relationship. In operation, the fingers, which normally hang directly beneath sleeves 78, are held in a support position with cam plates 80 mounted adjacent to chains 38 and 40 with supports 82 connected to the frame of the cutter in a conventional fashion. The cam plates are positioned to hold support fingers 36 outwardly away from chains 38 and 40, preferably at an angle of about 45 to 90° with ground level 18, while they are supporting vines cut and pulled by wheel 10. The support fingers 36 can be shaped in various configurations to support and elevate the cut vines, e.g., angled, curved, straight, etc. It is to be noted that the outer periphery 84 of housing 54 can be used as a cam surface similar to cam plate 80, to hold support fingers 36 in a predetermined support position as the fingers move around housing 54.

In operation, wheel 10 is drawn along row 30 in the fashion herein described to cut and uproot the roots of crops growing along said row. As the wheel rotates support fingers 36, connected to chains 38 and 40, coact with the severed vines to support them in an upright position and to elevate the vines to a predetermined position above ground level 18. When the fingers reach said predetermined position they are no longer supported by cam plates 80 and accordingly drop their load onto a conveyor, now shown in the drawings, for transporting the severed vines to a harvester or onto a windrow.

Whereas there is herein illustrated and specifically described a certain preferred construction which is presently regarded as the best mode of carrying out the invention, it should be understood that various changes made be may be make made and other construction adopted without departing from the inventive subject matter particularly pointed out and claimed.

I claim:

1. A cutter for severing plants from their roots which comprises a cutting wheel, having a peripheral-cutting surface, rotatably mounted to a support frame; means attached to said support frame for moving said frame along a row of plants such that the peripheral-cutting surface of said cutting wheel is maintained at an angle of 10 to 45° with said row of plants and at an angle of 45 to 80° with ground level to rotate said wheel by a coaction between the peripheral-cutting surface and the go ground; and lifting means secured to said support frame for supporting said plants as said cutting surface of said cutting wheel severs the roots of said plants and for lifting said plants to an elevated position above ground level, wherein said lifting means comprises a plurality of spaced support fingers, positioned on opposite sides of said row and secured to support finger-elevating means for elevating said support fingers above ground level as the cutting wheel is rotated.

2. The cutter of claim 1 wherein said peripheral-cutting surface of said wheel is tapered at an angle of 10 to 45° with the center axis of said wheel to be positioned substantially parallel with ground level when said wheel is drawn along said row.

3. The cutter of claim 1 wherein said support fingers are shaped to be positioned at an angle of 45 to 90° with ground level when said fingers are supporting and elevating crops cut by said cutting wheel.

4. The cutter of claim 3 wherein drive means for driving said lifting means are connected to said cutting wheel for driving said lifting means with the rotating cutting wheel.

5. The cutter of claim 4 wherein said peripheral cutting surface of said wheel is tapered at an angle of 10 to 45° with the center axis of said wheel to be positioned substantially parallel with ground level when said wheel is drawn along said row.

6. The cutter of claim 1 wherein said lifting means are provided with position control means for adjusting the elevation and angle of said support fingers with ground level.